Figure 1:
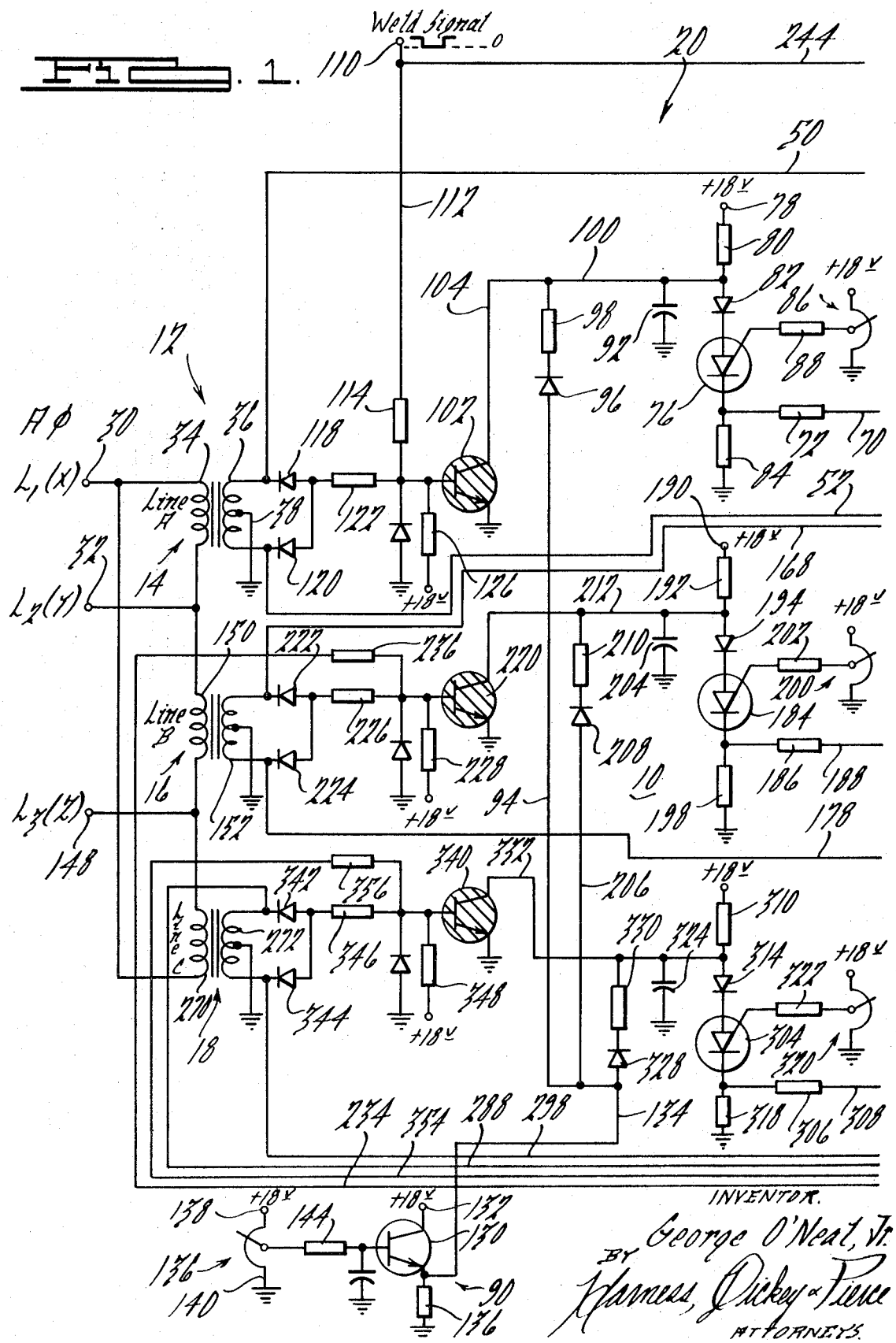

United States Patent

[11] 3,622,738

[72] Inventor George O'Neal, Jr.
Detroit, Mich.
[21] Appl. No. 17,474
[22] Filed Mar. 9, 1970
[45] Patented Nov. 23, 1971
[73] Assignee Weltronic Company
Southfield, Mich.

[54] MULTIPHASE CONTROL CIRCUIT
21 Claims, 2 Drawing Figs.
[52] U.S. Cl................................................... 219/114,
323/22
[51] Int. Cl..................................................... B23k 11/24
[50] Field of Search........................................... 219/108,
114; 323/22

[56] References Cited
UNITED STATES PATENTS
2,600,585  6/1952  Solomon ...................... 219/114
3,089,948  5/1963  Stadium et al................ 219/114 X Primary Examiner—J. V. Truhe
Assistant Examiner—J. G. Smith
Attorney—Harness, Dickey & Pierce ABSTRACT: A heat control system for controlling the firing of the control elements, i.e., power-controlled rectifiers, in a welding system utilizing a single-control potentiometer to control the firing angle of each phase in a three-phase power supply system, the circuit including a synchronizing circuit which is adapted to reproduce the weld signal occurring in the first phase for the second and third phases to exactly reproduce the firing angle in the second and third phases irrespective of the relative phase angle of the second and third phases with respect to the first phase.

INVENTOR.
George O'Neal, Jr.
BY Harness, Dickey & Pierce
ATTORNEYS.

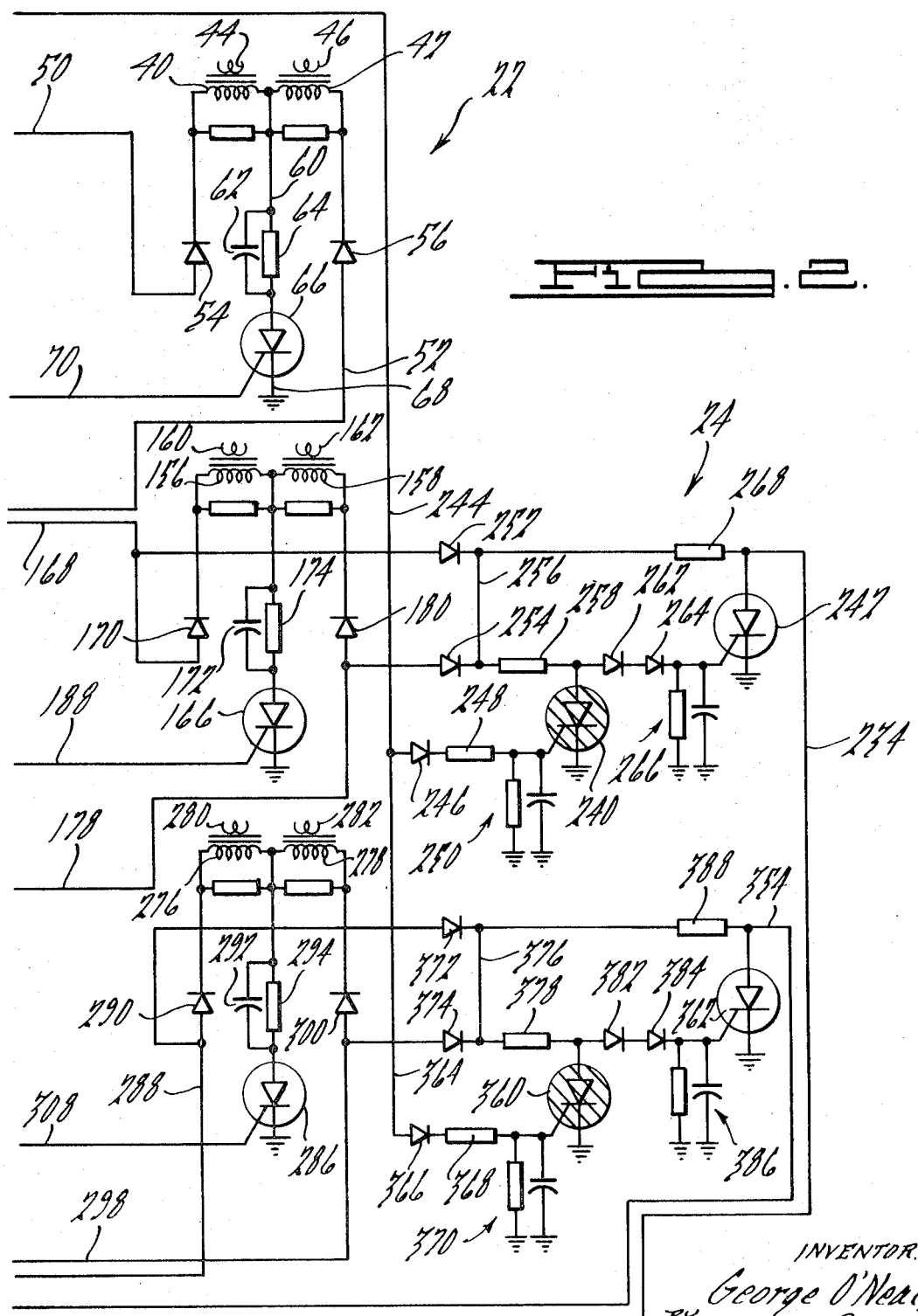

MULTIPHASE CONTROL CIRCUIT

BACKGROUND AND SUMMARY OF THE INVENTION

This invention relates generally to a control system for use in connection with controlling electrical energy supplied from a multiphase source to a load, and particularly to a control system for controlling the firing angle of control devices connected between a multiphase source and a load, the control system including a single element for controlling the firing angle of each of the phases and a synchronizing system for reproducing a condition precedent signal occurring in the first phase in each of the subsequent second and third phases irrespective of the relative phase angle between each of the phases of the multiphase system.

In supplying three-phase-controlled energy to a load, it is common practice to provide a plurality of controlled devices between the source and the load, and the conduction of the controlled devices is selected within each half cycle to control the envelope of energy being supplied the load from each phase. In systems of this type, it is important that the firing angle of each phase be identical to insure that the identical quantity of energy is supplied from each phase, thus insuring a balanced system irrespective on the relative phase angle of each phase relative to the other phases.

In the case of multiphase systems, it is a common practice to supply single-phase loads from one or more of the phases of the multiphase system, thus unbalancing the relative phase angles of, for example, the B- and C-phase relative to the A-phase. Thus, systems which control the firing angle of each of the phases in response to the phase angle of one of the phases create problems in tracking of the remaining two phases relative to the first phase, thus causing an unbalanced system.

Certain prior systems have been utilized in the past to control three-phase energy being supplied to the load. For example, one prior system includes an individual RC-timing network for each phase and a unijunction transistor associated with each timing network. In this case, the resistive portions of the RC-timing networks were ganged together such that they were controlled by a single-control knob. However, difficulty is encountered in utilizing systems of this type due to the fact that the mechanical backlash in the ganged resistors introduced certain errors. Also, the linearity of each potentiometer or variable resistor varied to introduce less than perfect tracking in at least two of the phases. Further, with systems of this type, it was difficult to apply wave-shaping controls as for example slope control or a voltage-current regulation control.

In certain other systems of the prior art, a single-voltage control has been devised which includes a control for one of the phases of the multiphase system and a delay network is provided for each of the other phases to delay the control signal for the remaining phases. For example, in a three-phase system, a single phase was controlled by a control signal and this control signal is duplicated 120° and 240° later to control the second and third phases. However, in systems of this type, it has been found that the second and third phases were not always 120° and 240° delayed from the first phase. Thus, poor tracking was introduced to this system. Certain other systems were devised in connection with magnetic amplifiers and conductive splitters. However, these systems were expensive to manufacture, were highly voltage sensitive and unreliable in use.

In accordance with the system of the present invention, a high-impedance, nonmagnetic, inexpensive, simple, precise single-voltage control is provided which avoids the drawbacks of the prior systems described above. With the system of the present invention, an enabling, in this case a weld, signal is provided during the entire first phase of the multiphase power supply. During the presence of this weld signal, a firing signal is generated, the firing signal being timed from the start or zero crossover point of the first phase. The enabling signal is then reproduced for the second phase to occur for the entire second phase and a second firing signal is generated in accordance with the preselected angle determined by the firing angle of the first phase. This correlation between the first and second phase firing angle is achieved through the use of a single-control potentiometer or control voltage which is utilized to charge a timing element in each of the phases to be controlled. The timing element or timing circuit in each of the phases is selected to be closely matched to further insure tracking of one phase relative to another. A similar condition exists for the remaining phases of the circuit.

The system of the present invention also includes certain balancing elements, these balancing elements being remote from the timing portion of the system such that a change in firing angle due to a change in a control potentiometer or control voltage, will not effect the balance between phases. Further, with the system of the present invention, the line voltage variations have no effect on the control system because the system is always referenced to the crossover point for the particular phase being controlled rather than a point in the waveform at which current is flowing, as is the case for some magnetic systems.

Further, the system provides a high-impedance input for the heat control or control voltage to isolate noise from the heat control and thereby permit the remote installation of the control portion of the circuit. Also, this eliminates any noise which may be generated in the vicinity of the control circuit, whether it be remote or proximate.

Accordingly, it is an object of the present invention to provide an improved control system for supplying electrical energy from a three-phase source to a load.

It is another object of the present invention to provide an improved control system for use in connection with providing three-phase-controlled electrical energy to a welding load.

It is still another object of the present invention to provide an improved firing control system for controlling the firing angle of q three-phase power supply, wherein the tracking of the phases is greatly improved.

It is still a further object of the present invention to provide an improved three-phase welding system which provides a single control for the firing angle of all three phases or providing improved tracking thereof.

It is still another object of the present invention to provide an improved heat control system for a three-phase welding circuit wherein an enabling signal is generated for a first phase and subsequent enabling signals are generated for each additional phase of the system, the subsequent enabling signals bearing the same relationship to the subsequent waves as the first enabling signal bore to the first phase wave.

It is still a further object of the present invention to provide an improved three-phase firing system which utilizes a pretiming signal, the pretiming signal being identical for each phase to insure improved tracking of each phase.

It is still another object of the present invention to provide an improved phase-synchronization system which exactly synchronizes each subsequent phase of a multiphase system with a preselected phase.

It is still a further object of the present invention to provide an improved multiphase control system which includes a system for generating an enabling signal as described above and further a system for generating subsequent enabling signals which bear the identical relationship with the start of each subsequent phase as the enabling signal described above bears with the first phase starting point.

It is a further object of the present invention to provide an improved system for balancing each phase of a multiphase system.

It is another object of the present invention to provide an improved balancing system for a multiphase control circuit wherein the variation and firing angle of the phases does not vary the balance between the phases.

It is another object of the present invention to provide an improved control system for a multiphase power supply which is inexpensive to manufacture, easy to install and reliable in use. Further objects, features and advantages of this invention will become apparent from a consideration of the following description, the appended claims and the accompanying drawings in which:

FIG. 1 is a portion of a schematic diagram illustrating a preferred form of control system of the present invention; and FIG. 2 is the remainder of the schematic diagram of FIG. 1 illustrating the features of the present invention.

Referring now to the drawings, there is illustrated a schematic diagram of a system 10 incorporating certain preferred features of the present invention. The system includes a power supply input circuit 12, including phase A, phase B and phase C transformers 14, 16, 18, which is connected to the main multiphase source connected to the load. The system further includes a three-phase heat control circuit 20, a controlled rectifier firing circuit 22 for each phase which is controlled by the heat control circuit and, in turn, controls the supply of energy to the load and a synchronizer circuit 24 for synchronizing the B- and C-phases with respect to the A-phase, as will be more clearly explained hereinafter.

Referring particularly to the control system for phase A, an input signal is provided across one phase $L_1$ 1 $L_2$ at input terminals 30, 32. The input terminals 30, 32 are connected across a primary winding 34 of the input transformer 14, the secondary winding 36 being magnetically coupled thereto by means of a magnetic core. The secondary winding 36 is center tapped to ground by means of a conductor 38 and the energy being fed to the secondary winding 36 is fed to a pair of primary windings 40, 42 of a pulse transformer, the pulse transformers also including secondary windings 44, 46. The transformers secondaries 44, 46 are utilized to provide the firing pulses to either a direct or conventional anode firing circuit to control the three-phase electrical energy being supplied from a three-phase source (not shown) to a welding load (not shown), in the preferred embodiment.

As stated above, the secondary winding 36 is center tapped and the output thereof is fed to the secondary windings 40, 42 by means of conductors 50, 52 and rectifying devices 54, 56 respectively. Thus, when the upper end of the transformer secondary 36 is positive relative to the ground 38, the conductor 50 is positive and current will flow through the diode 54, including winding 40 and a control circuit including a conductor 60, a capacitor 62-resistor 64 combination, and a controlled rectifier device 66 to ground at 68. Thus, the conduction of positive energy through the winding 40 is directly controlled by the conduction of control rectifier 66. On the other hand, if the lower end of the secondary winding 36 is positive relative to ground 38, the conductor 52 will conduct positive current through the diode 66, the winding 42, the resistor 64-capacitor 62 combination and the controlled rectifier 66 to ground. This assumes that the control rectifier 66 is in a conductive state.

As will be explained hereinafter, the firing angle of control rectifier 66 is controlled by means of a heat control circuit, thus controlling the point in the positive or negative half cycle, generated in a secondary winding 36, at which the control rectifier 66 will conduct. Thus is provided the primary current through either the primary winding 40 or the primary winding 42 depending on the particular half wave of phase A which is occurring at any instant of time. Conventionally, the secondary windings 44, 46 are connected to the appropriate gate electrodes or igniter electrodes or other conventional firing circuits in accordance with the particular half wave to be conducted through the main control device connected between the three-phase power supply and heat-welding load.

As stated above, the controlled rectifier 66 controls the flow of firing current through the firing transformers to ground. The start of conduction or the firing angle, of the controlled rectifier 66 is controlled by means of a signal fed to the gate electrode of the controlled rectifier 66 by means of a conductor 70. The signal on conductor 70 is supplied through the drop across a resistor 72 in response to the conductive condition of a programmable unijunction transistor 76. The unijunction transistor includes an anode electrode connected to a positive source of 18-volt potential at input terminal 78 through a resistor 80 and a rectifying diode 82 and the cathode electrode is connected to ground potential through a resistor 84. The gate electrode of the unijunction transistor 76 is connected to a balancing potentiometer 86 by means of a resistor 88. The programmable unijunction transistor 76 operates such that when the voltage at anode electrode exceeds the gate electrode voltage, the device will be rendered conductive.

The timing circuit for the unijunction transistor 76 includes a heat control subcircuit 90 which is connected to a timing capacitor 92 through a conductor 94, a diode 96, a timing resistor 98 and a conductor 100. The capacitor 92 and the resistor 98 form a RC-timing network for timing the phase angle at which the unijunction transistor 76 will conduct. Thus, the voltage at terminal 78 will combine with a preselected voltage set on conductor 94 to charge capacitor 92 and raise the voltage on conductor 100 to a sufficient level to exceed the gate voltage of unijunction transistor 76 after a preset period of time determined by the voltage selected for conductor 94. At this preset period of time, the unijunction transistor 76 will conduct to provide an output signal on conductor 70 to fire the control rectifier 66 and ultimately to fire the control devices connected between the source of three-phase electrical energy and the load. In the absence of a voltage or signal on conductor 94, the capacitor 92 will charge to a preselected value which will determine a firing angle of the circuit by means of the charging of the capacitor 92 through resistor 80. In the preferred embodiment, the resistor 80 has been selected to raise the voltage on conductor 100 to the firing level for unijunction transistor 76 at a point wherein 20 percent of the energy remains under the half wave. However, it is to be understood that this figure is purely arbitrarily selected and could be selected from any percent heat, within practical limits.

The ability of capacitor 92 to charge and thus perform the timing function, is controlled by means of a normally conducting transistor 102 which is connected to the upper end of capacitor 92 by means of the conductor 100 and a conductor 104. The conduction of transistor 102 will ground the conductor 100, and thus the upper end of the capacitor 92, through the collector-emitter circuit of the conductive transistor 102. It is to be noted that the emitter electrode is connected to ground. Thus, when the transistor 102 is conducting, the capacitor 92 will be grounded to preclude the circuit from timing out, and the unijunction transistor 76 from conducting.

The transistor 102 is maintained in the conductive state by means of a weld signal supplied at the input terminal 110 through a conductor 112 and a resistor 114, the lower end of the resistor 114 being connected to the base electrode of transistor 102. The weld signal is illustrated to the right of terminal 110 and is seen to e at a positive level during the nonweld portion of the cycle and will remain at this level until such time as the start of the weld cycle is to commence. The weld signal is seen to drop from a positive level to ground at the start of the weld portion of the cycle and then returns to the positive level at the end of the weld portion. The positive level is sufficiently high to preclude the transistor 102 from being rendered nonconductive during any portion of the cycle being fed to the base electrode from the secondary winding 36.

As is seen, the secondary winding 36 is also connected to the base electrode by means of a pair of diodes 118, 120 and a resistor 122. It is to be noted that the diodes 118, 120 are poled such that the negative pulses are fed to the base electrode of the transistor 102. Also, a positive potential is fed to the base electrode by means of a resistor 126. When the weld signal is not present, and thus is at a very high positive level, the transistor 102 is rendered conductive at all times to ground the capacitor 92 and precluding any charge from developing thereon.

However, when the weld signal is at ground potential, the relative values of the voltages supplied to the base electrode of transistor 102 during the weld portion are such that the transistor 102 conducts for an extremely brief period of time at the zero crossover point of the A phase line voltage. This brief conduction of transistor 102 will insure that the capacitor 92 is completely discharged from the previous cycle and also that the unijunction transistor 76 has ceased conduction. Thus, when the weld cycle commences, the transistor 102 will conduct very briefly and then go out of conduction to permit the capacitor 92 to charge from the voltage supplied on conductor 94 from the heat control circuit 90 and simultaneously, from the voltage being supplied at input terminal 78. The charge on capacitor 92 due to the voltage on conductor 94 will develop extremely fast due to the value selected for resistor 98.

Referring now to the heat control circuit 90, the circuit consists of a main control transistor 130, the collector of which is connected to a positive 18-volt potential at an input terminal 132 and the emitter of which is connected to the conductor 94 through a conductor 134 and to ground potential through a resistor 136. The transistor 130 is connected in an emitter-follower configuration and the base electrode is provided with a control potential from a potentiometer 136. The potentiometer is connected between a positive 18-volt potential at terminal 138 and ground potential at conductor 140. The slider of the potentiometer 136 is connected to the base electrode through a relatively high resistor 144. The transistor 130 provides a high input impedance from the base to the emitter circuit and a low output impedance from the collector to the emitter circuit. In this way any noise is isolated from the conductor 134. While the input voltage to the transistor 130 has been described as being a potentiometer 136, it is to be understood that a variable direct voltage may also be provided, as for example in a slope control circuit, or a closed or open loop regulation circuit. Thus, the control circuit, the variable voltage or the potentiometer, may be remotely located relative to the control circuit or the load circuit without introducing an appreciable amount of noise into the system. The heat control circuit 90 is utilized to provide selectable precharge for the capacitor 92 and the resistor 98 has been chosen to be such, relative to the resistor 80, that the potential supplied to conductor 94 is immediately placed on the capacitor 92 as a precharge. This precharge is selected from the potentiometer 136 alternatively, from the variable voltage being fed to the transistor 130, and determines the time it takes capacitor 92 to charge to the firing level for the unijunction transistor 76 as it is charged from the positive 18-volt potential at input terminal 78. Accordingly, if a lower precharge is supplied from the circuit 90, it will take a greater amount of time for capacitor 92 to charge to the firing level from the source at the terminal 78. Thus, the firing angle is advanced and the percent heat being fed to the load is reduced. It is to be noted that the balance circuit 86 is not interconnected in the timing circuit, including resistor 98 and capacitor 92. Thus, the balance provided by circuit 86 does not affect the timing curve for the firing angle of unijunction transistor 76.

Referring now to the second phase or phase B of the system of the present invention, the line voltage is sensed across terminal 32 and a third terminal 148. The voltage between terminals 32 and 148 are fed to a primary winding 150 of the transformer 16, the primary winding being magnetically coupled to a center-tapped secondary winding 152. The secondary winding 152 is connected to a pair of firing-pulse transformers, including primary windings 156, 158 which are magnetically coupled to a pair of secondary windings 160, 162, respectively. As was the case with phase A, the current through the primary windings 156, 158 are controlled by a means of a controlled rectifier 166, the current in one direction flowing from the secondary winding 152 through a conductor 168, a diode 170, the primary winding 156, a capacitor 172-resistor 174 combination, and the control rectifier 166 to ground. The opposite half cycle flows from the secondary winding 152 through a conductor 178, a diode 180, the primary winding 158, the capacitor 172-resistor 174 combination, and the control rectifier 166 to ground.

As was the case with phase A, the conduction of control rectifier 166 is controlled by controlling the conduction of a programmable unijunction transistor 184, the conduction of transistor 184 being sensed by means of a resistor 186 and conductor 188 connected to the gate electrode of controlled rectifier 166. The main current circuit for the unijunction transistor 184 is from a source of positive potential at input terminals 190 through a resistor 192, a diode 194, the anode-cathode circuit of the unijunction transistor 184, to ground through a resistor 198.

As was the case with phase A, the conduction of the transistor 184 is dependent on the anode voltage exceeding the gate voltage, the ate voltage being established by means of a balancing potentiometer circuit 200, the slider thereof being connected to the gate electrode by means of a resistor 202. The anode voltage is controlled by the amount of charge on a capacitor 204, the charge on the capacitor 204 being established initially by a precharge derived from the control circuit 90, as fed to the capacitor 204 means of the conductor 134, the conductor 206, a diode 208, a resistor 210 and a conductor 212. After the charge on the capacitor 204 reaches the proportionate share of the voltage established by the potentiometer circuit 136, or in the alternative the selectable voltage, the charging of capacitor 204 is determined by a RC-timing circuit including the voltage established at the terminal 190 and the resistor 192. Accordingly, when the charge on capacitor 204 establishes a voltage at the anode of transistor 184 which exceeds the voltage fed from the potentiometer circuit 200, the transistor 184 will conduct by a firing pulse for the control rectifier 166.

In the case of phase A, the charge on capacitor 92 was maintained at a zero potential due to the conduction of transistor 102, which transistor conducted during the period that the weld signal did not appear. In the case of phase B, a similar situation exists in that the charge on capacitor 204 is maintained at a zero level by the conduction of a transistor 220, the collector thereof being connected to the upper part of capacitor 204, the conduction of the transistor 220 grounding the capacitor 204. As was further the case with phase A, the base electrode of the transistor 204 is connected to receive the negative half wave of the line voltage as sensed by the secondary winding 152, its negative wave being fed to the base electrode by means of a pair of diodes 222, 224, and a resistor 226. Also, a positive 18-volt potential is impressed on the base electrode of transistor 220 by means of a resistor 228. Thus, in the absence of any other signals, the negative going wave will maintain the transistor 220 in the nonconductive state except for a small period of time when the negative half wave reaches very nearly zero potential. In this case, the positive potential supplied through resistor 228 will take over to forward bias the base-emitter circuit of transistor 220 to reset capacitor 204 and controlled rectifier 184.

As was explained above, the charging of capacitor 92 was inhibited by the absence of the weld signal. However, this weld signal is not fed to the B- or C-phases because of the fact that the weld signal only appears from the start of an A-phase wave (the zero crossover point) and ends at the end of an A-phase wave (the zero crossover point). As will be readily apparent, the weld signal will not be present for a portion of the B- and C- final half-waves which occur after the end of the A-phase waveform and the end of the weld signal. Thus, in order to control the entire B- and C-phase waveforms and insure that a portion of the energy is not lost, the system of the present invention has been devised to reproduce the weld signal from the start of the B-phase waveform to the end of the B-phase waveform. A similar circuit is devised for the C-phase to insure that the entire C-phase is controlled.

This reproduced weld signal is generated in the synchronizing circuit 24 and is fed back to the base electrode of transistor 220 by means of a conductor 234 and a resistor 236. Thus, a simulated weld signal is impressed on the base of transistor 220, the weld signal being delayed from the A-phase weld signal by a number of degrees which is equal to the number of degrees that the B-phase lags the A-phase. A similar situation occurs for C-phases which will be hereinafter explained. Accordingly, the transistor 220 will be rendered nonconductive during the entire portion of the B-phase during which the simulated B-phase weld signal occurs with the exception of the instantaneous conduction of the transistor 220 when each time that the rectified, negative B-phase wave form very nearly reaches zero. This latter conduction is utilized to reset the charge on capacitor 204 and to insure that the controlled rectifier 184 is nonconductive.

Referring particularly to the upper portion of the synchronizer circuit 24, it is seen that the circuit consists of a normally conducting controlled rectifier 240 and a normally nonconductive controlled rectifier 242. The controlled rectifier 240 is rendered conductive due to two conditions, the first being the supplying of the weld signal, a normally positive signal, to the gate electrode of the controlled rectifier 240 by means of a conductor 244 a diode 246, a resistor 248 and a resistor-capacitor combination circuit 250. The second condition is the feeding of the positive full wave rectified signal from the B-phase transformer 16 by means of the conductors 168, 178 through diodes 252, 254, conductor 256 and resistor 258.

Thus, during the B-phase positive or negative going half wave and before the weld signal has dropped to ground potential, the control rectifier 240 will be conductive because of the positive signal being fed to the gate electrode thereof through diode 246 and resistor 248 and the presence of a positive voltage at the anode electrode of the controlled rectifier 240, as fed thereto by means of the resistor 258. When the weld signal drops to ground potential, thus removing the gate signal from controlled rectifier 240, the anode electrode of controlled rectifier 240 will still be supplied with a positive potential due to the remaining portion of the B-phase half wave which is present after the zero crossover point of the A-phase current (the start of the weld signal). This positive voltage will maintain the controlled rectifier 240 in conduction until the end of that B-phase half wave. However, the controlled rectifier 240 will be extinguished for subsequent half waves due to the lack of a gate signal at the gate electrode of controlled rectifier 240.

When the controlled rectifier 240 is rendered nonconductive, a positive signal is fed to the gate electrode of the controlled rectifier 242 by means of a pair of diodes 262, 264 and a resistive-capacitor combination circuit 266, this signal being derived from the positive-going waveform being fed thereto by means of resistor 258 and the two diodes 262, 264. Simultaneously, the anode electrode of controlled rectifier 242 is supplied with a positive potential by means of a resistor 268. Thus, at the zero crossover point of the B-phase, the controlled rectifier 242 will be rendered conductive to ground conductor 234. This ground signal is fed back to the input circuit or base electrode of transistor 220, thus rendering the transistor 220 nonconductive. The nonconduction of transistor 220 will permit the charging of capacitor 204 in the manner described above to time the firing angle of the B-phase energy being fed to the welding load.

At the end of the B-wave form, which corresponds to the end of the simulated A-phase welding signal, a positive potential is impressed on conductor 244 to provide a gate signal for controlled rectifier 240. This gate signal renders control rectifier 240 conductive, thus grounding the gate electrode of controlled rectifier 242. However, it will be remembered that the anode voltage of controlled rectifier 242 is still positive due to the fact that the B-phase rectified signal being fed to resistor 268 is still positive until the end of the particular half wave that the weld signal terminated. Thus, the controlled rectifier will remain conductive even after the controlled rectifier 240 is nonconductive. However, upon reaching the zero crossover point of the B-phase, the controlled rectifier 242 will be rendered nonconductive to again impress the positive signal on conductor 234. This positive signal will cause transistor 220 to conduct and reset the capacitor 204 and the transistor 184 to terminate the B-phase portion of the weld cycle.

Referring now to the third phase or phase C of the system of the present invention, the line voltage is sensed across terminals 30 and 148. The voltage between terminals 30 and 148 are fed to a primary winding 270 of the transformer 18, the primary winding being magnetically coupled to a center-tapped secondary winding 272. The secondary winding 272 is connected to a pair of firing-pulse transformers, including primary windings 276, 278 which are magnetically coupled to a pair of secondary windings 280, 282, respectively. As was the case with phases A and B, the current through the secondary windings 276, 278 are controlled by a means of a controlled rectifier 286, the current in one direction flowing from the secondary winding 272 through a conductor 288, a diode 290, the secondary winding 276, a capacitor 292-resistor 294 combination, and the control rectifier 286 to ground. The opposite half cycle flows from the secondary winding 272 through a conductor 298, a diode 300, the secondary winding 278, the capacitor 292-resistor 294 combination, and the control rectifier 286 to ground.

As was the case with phases A and B, the conduction of control rectifier 286 is controlled by controlling the conduction of a programmable unijunction transistor 304, the conduction of transistor 304 being sensed by means of a resistor 306 and conductor 308 connected to the gate electrode of controlled rectifier 286. The main current circuit for the unijunction transistor 304 is from a source of positive potential at input terminals 310 through a resistor 312, a diode 34, the anode-cathode circuit of the unijunction transistor 304, to ground through a resistor 318.

As was the case with phase A, the conduction of the transistor 304 is dependent on the anode voltage exceeding the gate voltage, the gate voltage being established by means of a balancing potentiometer circuit 320, the slider thereof being connected to the gate electrode by means of a resistor 322. The anode voltage is controlled by the amount of charge on a capacitor 324, the charge on the capacitor 324 being established initially by a precharge derived from the control circuit 90, as fed to the capacitor 324 by means of the conductor 134, the conductor 326, a diode 328, a resistor 330 and a conductor 332. After the charge on the capacitor 324 reaches the proportionate share of the voltage established by the potentiometer circuit 136, or in the alternative the selectable voltage, the charging of capacitor 324 is determined by a RC-timing circuit including the voltage established at the terminal 310 and the resistor 312. Accordingly, when the charge on capacitor 324 establishes a voltage at the anode of transistor 304 which exceeds the voltage fed from the potentiometer circuit 320, the transistor 304 will conduct by a firing pulse for the control rectifier 286.

In the case of phase A, the charge on capacitor 92 was maintained at a zero potential due to the conduction of transistor 102, which transistor conducted during the period that the weld signal did not appear. In the case of phase C, a similar situation exists in that the charge on capacitor 324 is maintained at a zero level by the conduction of a transistor 340, the collector thereof being connected to the upper part of capacitor 324, the conduction of the transistor 340 grounding the capacitor 324. As was further the case with phase A, the base electrode of the transistor 324 is connected to receive the negative half wave of the line voltage as sensed by the secondary winding 272, its negative wave being fed to the base electrode by means of a pair of diodes 342, 344 and a resistor 346. Also, a positive 18-volt potential is impressed on the base electrode of transistor 340 by means of a resistor 348. Thus, in the absence of any other signals, the negative going wave will maintain the transistor 340 in the nonconductive state except for a small period of time when the negative half wave reaches very nearly zero potential. In this case, the positive potential supplied through resistor 348 will take over to forward bias the base emitter circuit of transistor 340 to reset capacitor 324 and controlled rectifier 304.

As was explained above, the charging of capacitor 92 was inhibited by the absence of the weld signal and this weld signal is not fed to the B- or C-phases. Thus, in order to control the entire C-phase waveform and insure that the final portion of the energy is not lost, the system of the present invention reproduces the weld signal from the start of the C-phase waveform to the end of the C-phase waveform.

This reproduced weld signal is generated in the synchronizing circuit 24 and is fed back to the base electrode of transistor 340 by means of a conductor 354 and a resistor 356. Thus, a simulated weld signal is impressed on the base of transistor 340, the weld signal being delayed from the B-phase weld signal by a number of degrees which is equal to the number of degrees that the C-phase lags the B-phase. Accordingly, the transistor 340 will be rendered nonconductive during the entire portion of the C-phase during which the simulated C-phase weld signal occurs with the exception of the instantaneous conduction of the transistor 340 when each time that the rectified, negative C-phase waveform very nearly reaches zero. This latter conduction is utilized to reset the charge on capacitor 324 and to insure that the controlled rectifier 304 is nonconductive.

Referring particularly to the lower portion of the synchronizer circuit 24, it is seen that the circuit consists of a normally conducting controlled rectifier 360 and a normally nonconductive controlled rectifier 362. The controlled rectifier 360 is rendered conductive due to two conditions, the first being the supplying of the weld signal, a normally positive signal, to the gate electrode of the controlled rectifier 360 by means of a conductor 364, a diode 366, a resistor 368 and a resistor-capacitor combination circuit 370. The second condition is the feeding of the positive full wave rectified signal from the C-phase transformer 18 by means of the conductors 286, 288 through diodes 372, 374, conductor 376 and resistor 378. Thus, during the C-phase positive or negative going half wave and before the weld signal has dropped to ground potential, the control rectifier 360 will be conductive because of the positive signal being fed to the gate electrode thereof through diode 366 and resistor 368 and the presence of a positive voltage at the anode electrode of the controlled rectifier 360, as fed thereto by means of the resistor 378. When the weld signal drops to ground potential, thus removing the gate signal from controlled rectifier 360, the anode electrode of controlled rectifier 360 will still be supplied with a positive potential due to the remaining portion of the C-phase half wave which is present after the zero cross over point of the B-phase current (the start of the simulated B-phase weld signal).

This positive voltage will maintain the controlled rectifier 360 in conduction until the end of that C-phase half wave. However, the controlled rectifier 360 will be extinguished for subsequent half waves due to the lack of a gate signal at the gate electrode of controlled rectifier 360.

When the controlled rectifier 360 is rendered nonconductive, a positive signal is fed to the gate electrode of the controlled rectifier 362 by means of a pair of diodes 382, 384 and a resistive-capacitive combination circuit 388, this signal being derived from the positive-going waveform being fed thereto by means of resistor 378 and the two diodes 382, 384. Simultaneously, the anode electrode of the controlled rectifier 362 is supplied with a positive potential by means of a resistor 388. Thus, at the zero crossover point of the C-phase, the controlled rectifier 362 will be rendered conductive to ground conductor 354. This ground signal is fed back to the input circuit or base electrode of transistor 340, thus rendering the transistor 340 nonconductive. The nonconduction of transistor 340 will permit the charging of capacitor 324 in the manner described above to time the firing angle of the C-phase energy being fed to the welding load.

At the end of the C-waveform which corresponds to the end of the simulated C-phase welding signal, a positive potential is impressed on conductor 364 to provide a gate signal for controlled rectifier 360. This gate signal renders control rectifier 360 conductive, thus grounding the gate electrode of controlled rectifier 362. However, it will be remembered that the anode voltage of controlled rectifier 362 is still positive due to the fact that the C-phase rectified signal being fed to resistor 388 is still positive until the end of the particular half wave that the weld signal terminated. Thus, the controlled rectifier will remain conductive even though the controlled rectifier 360 is nonconductive. However, upon reaching the zero crossover point of the C-phase, the controlled rectifier 362 will be rendered nonconductive to again impress the positive signal on conductor 354. This positive signal will cause transistor 340 to conduct and reset the capacitor 324 and the transistor 304 to terminate the C-phase portion of the weld cycle.

From the foregoing, it is seen that a three-phase control system has been provided which permits exact tracking of each phase relative to the other phases without depending on an exact phase relationship between phases.

While it will be apparent that the preferred embodiments of the invention disclosed are well calculated to fulfill the objects above stated, it will be appreciated that the invention is susceptible to modification, variation and change without departing from the spirit thereof.

What is claimed is:

1. In a welding system for supplying controlled multiphase, phase-controlled, welding energy from a multiphase source having at least a first and second phase to a welding load in response to a control system, said control system generating a main weld signal, said main weld signal being generated in said control signal to control the duration of application of energy to the load, the improvement comprising means for generating a firing signal for controlling the firing angle of a first of the phases during the period of the weld signal, generating means for generating a simulated weld signal as a result of the main weld signal having a duration as long as the duration of the main weld signal and having a start point which is delayed from the start of the main weld signal by a duration which is a function of the lag of the second phase relative to the first phase and means for generating a firing signal for controlling the firing angle of the second phase, as a function of said simulated weld signal.

2. The invention of claim 1 wherein said generating means includes means responsive to said main weld signal.

3. The improvement of claim 2 wherein said generating means further includes means responsive to a preselected electrical condition of said second phase.

4. The improvement of claim 3 wherein said electrical condition is the zero current crossover point of said second phase.

5. The improvement of claim 3 wherein said generating means includes a semiconductor device having a control electrode and a second electrode said electrodes being connected to respond to said main weld signal and said electrical condition.

6. The improvement of claim 5 wherein said control electrode is connected to respond to said weld signal to enable said semiconductor device so that said semiconductor device changes an electrical condition in response to the occurrence of said zero current crossover point.

7. The improvement of claim 3 wherein said generating means includes means connected to act as an AND gate, said gate means responding to both said main weld signal and said electrical condition.

8. The improvement of claim 7 wherein said main weld signal is connected to one input of said gate acting means and said electrical condition is connected to another input of said gate acting means.

9. The improvement of claim 8 herein said electrical condition is the zero current crossover point of said second phase.

10. The improvement of claim 9 wherein said gate acting means includes a control rectifier having an anode electrode and a gate electrode said main weld signal being supplied to said gate electrode and said electrical condition being fed to said anode circuit.

11. The improvement of claim 10 wherein said control rectifier is in a first conductive state prior to the start of said main weld signal, said control rectifier switching from said first state to said second state in response to said second phase achieving said zero current crossover point.

12. The improvement of claim 11 wherein the start of said simulated weld signal is generated in response to said controlled rectifier switching from said first state to said second state.

13. The improvement of claim 12 wherein said generating means includes a second controlled rectifier having an anode electrode and a gate electrode, said gate electrode being connected to respond to the conductive condition of said first controlled rectifier.

14. The improvement of claim 13 wherein said second controlled rectifier controls the termination of said simulated weld signal.

15. The improvement of claim 14 wherein said second controlled electrode switches from said second state to said first state in response to said first controlled rectifier switching from said first state to said second state.

16. The improvement of claim 15 wherein said first controlled rectifier switches from said second state to said first state in response to the termination of said main weld signal.

17. The improvement of claim 16 wherein said second controlled rectifier remains in said first state after said first controlled rectifier switches from said second state to said first state.

18. The improvement of claim 17 wherein said second controlled rectifier switches from said first state to said second state in response to the zero current crossover point of said second phase.

19. The improvement on clam 18 wherein said firing signal-generating means includes gate means responsive to said simulated weld signal.

20. The improvement of claim 19 wherein said firing signal-generating means includes a timing circuit, said gate means enabling said timing circuit during said simulated weld circuit duration.

21. The method of controlling a welding system for supplying phase-controlled multiphase energy from a multiphase source having a first and second phase to a welding load comprising the steps of generating a main weld signal having a start at the start of a first phase half cycle and having a termination point at the end of a first phase half cycle, controlling the first phase in response to said main weld signal, generating a simulated weld signal as a result of the main weld signal having a duration as long as said main weld signal and a starting point at the start of a second phase half wave, and controlling the second phase in response to said simulated weld signal.

* * * * *